June 5, 1956     J. H. BOOTH     2,749,050
HEATING SYSTEM FOR AUTOMOTIVE VEHICLES
Filed Sept. 18, 1952
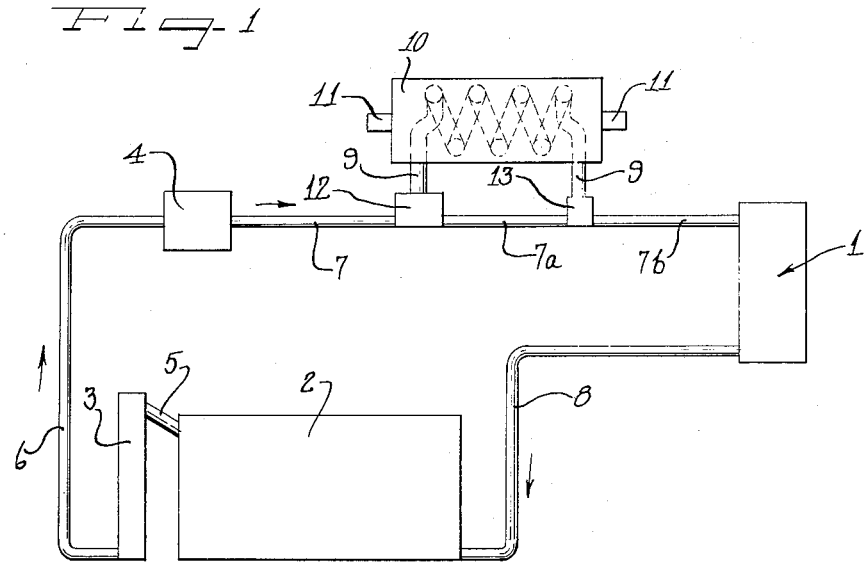
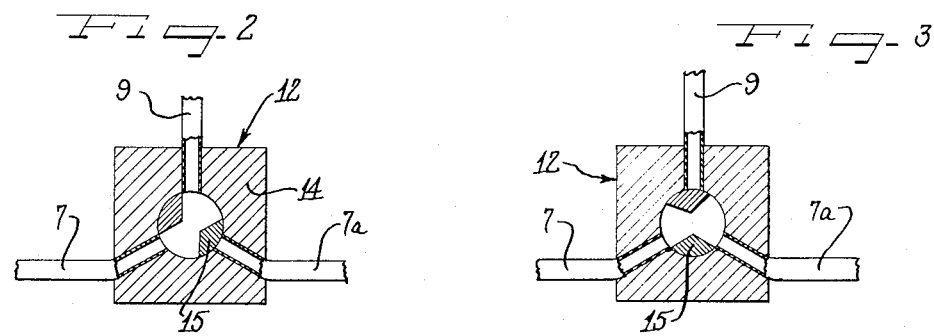
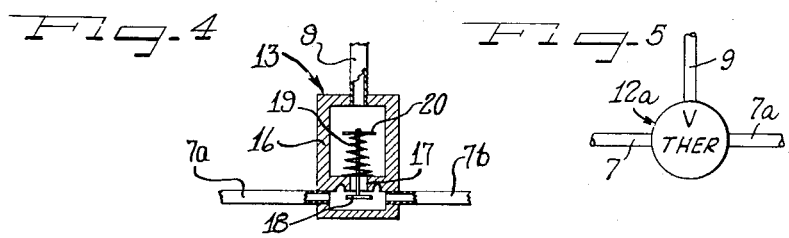
Inventor
James H. Booth United States Patent Office 2,749,050
Patented June 5, 1956

2,749,050

HEATING SYSTEM FOR AUTOMOTIVE VEHICLES

James H. Booth, Venice Township, Shiawassee County, Mich., assignor to Thompson Products, Inc., Cleveland, Ohio, a corporation of Ohio Application September 18, 1952, Serial No. 310,263

5 Claims. (Cl. 237—12.3)

This invention relates to automobile heating systems. More particularly, the invention is concerned with a heating system wherein the engine block and the interior of the automobile are both rapidly brought up to the desired operating temperature.

Automobile heaters now in general use have been designed with a basic consideration in mind. This consideration is the rapid heating of the interior of the automobile body compartment. Probably the poorest of all of the automobile heater systems with respect to the satisfaction of the requirement of rapid body compartment heating has been the hot water type of heater. In spite of its deficiency in this most important aspect however, the hot water heater has remained very popular in the automotive field because it is generally less expensive than other types, because it removes entirely the possibility of exhaust gases becoming mixed with the air in the body compartment, and also because it eliminates the necessity of a separate source of fuel supply required in the gasoline type of heater.

While public acceptance has been attained by the hot water type of heater because of its inexpensiveness and its safety, this acceptance is in spite of its important defect of slow heating and many attempts have been made in the past to improve the hot water heating system in order to obtain the advantages of rapid warm-up.

While improvements have been made, the prior art arrangements have proved expensive and complicated to such an extent that public acceptance has not been obtained and the heater systems of the hot water type now in general use are substantially similar to those developed years ago. It is therefore an object of the present invention to provide a hot water heating system for automobiles which provides a very rapid build-up of temperature thereby obviating the heretofore universal time delay accompanying the use of the hot water type of automobile heater.

Another object of the present invention is the provision of a novel heating system in which the motor cooling water temperature is rapidly increased to provide economical engine operation immediately after starting and to also provide hot water for the automobile body compartment heater.

Still another object of the present invention is the provision of an extremely simple and inexpensive hot water heater system wherein the usual delay in heat output is practically eliminated.

A feature of the present invention is the utilization of an exhaust gas-to-hot water heat exchanger in connection with the usual hot water heater system.

Yet another feature of the present invention is the provision of extremely simple and automatic means for raising the temperature of the hot water heating system rapidly and also for discontinuing such rapid heating action as soon as the heating system of the automobile has reached its desired operating range.

Another object of the present invention is the provision of means for utilizing the exhaust gas system of the vehicle for an auxiliary heating source.

A further object of the present invention is the provision of a system in which the rapidly heating exhaust gases of the vehicle may be temporarily utilized to provide heat to the automotive heating system and in which the source of exhaust gas heat may be removed from the system with a minimum of valves and conduits.

Still another object of the present invention is the provision of an automotive hot water heating system in which engine exhaust gases are utilized for bringing the hot water heating fluid to an operating temperature rapidly and which provides for selective elimination of the auxiliary heating effect of the exhaust gases in a convenient and extremely simple manner.

Still another object of the present invention is the provision of an exhaust gas-to-cooling water heat transfer unit utilizing a one-way check valve for permitting the water trapped in the heat exchanger to be released under pressure of steam generated in the heat exchanger upon discontinuance of circulation of the cooling fluid through the heat exchanger.

Yet another object of the present invention is the provision of a novel heat exchanger control conduit system in which an exhaust gas-to-cooling water heat exchanger may selectively be placed in a first position in series with the cooling system of the vehicle or may instead be placed in a second position partially isolated from the cooling water system, and in which in said second position the cooling water remaining in said heat exchanger may be released to said cooling water system through a one-way check valve.

Other objects and features of this invention will more fully appear from the following detailed description taken in connection with the accompanying drawings which illustrate a preferred embodiment thereof.

On the drawings:

Figure 1 is a schematic diagram of the overall heating system with the names of the individual parts indicated thereon;

Figure 2 is a schematic disclosure of a two-way valve utilized in the present heating system with the ports in the position occupied during the first, or engine starting phase of operation;

Figure 3 is a schematic disclosure of the two-way valve showing the ports in the position occupied after the exhaust gas-to-cooling water heat transfer unit has been effectively disconnected from the circuit;

Figure 4 is a schematic figure of the one-way valve utilized to exhaust water from the exhaust gas-to-water heat exchange unit after its disconnection from the circuit; and Figure 5 is a diagrammatic disclosure of the modified form of the two-way valve utilized in the present invention.

As shown on the drawings:

As shown in Figure 1 an automobile body compartment heater, generally indicated at 1 is connected in series with the cooling system of an automotive vehicle engine utilizing the now well known radiator 3. A water pump 4 is connected in series with the radiator 3 and draws water from the bottom thereof in the usual manner circulating it under pressure through the cooling system network, back through the engine and into the radiator.

As shown in Figure 1 the cooling system network comprises a conduit 5 which connects the engine block to the top of the radiator 3, a conduit 6 which connects the radiator to the water pump, a conduit 7 which connects the water pump to the inlet of the automobile body compartment heater 1, and a conduit 8 which connects the outlet of the body compartment heater to the cooling system of the motor 2.

The description of the system thus far is in general agreement with the usual heater systems in operation in present automotive vehicles. Under such a system the temperature of the fluid in the body compartment heater is entirely dependent upon the temperature of the cooling water in the motor 2 and the radiator 3. This temperature is of course very low when the motor first starts up and even when used with the usual flow control thermostats, the water temperature increases only slowly when the outside temperature is low as is usually the case in winter in the northern portions of the country.

In order to increase the rapidity with which the cooling water in the heater 1 and the motor 2 reaches its optimum operating temperatures, I have provided a novel heat exchanger arrangement whereby the hot exhaust gases, which become hot immediately upon starting of the engine, are placed in heat transfer relation with the cooling water of the motor and the compartment heater. As may be seen in Figure 1 the heat exchanger 10 is associated with the exhaust pipe 11 through which the hot exhaust gas is passed. The conduit 9 leads from a two-way valve in the conduit 7 through the heat exchanger 10 and out into the conduit 7a, 7b by means of the one-way valve 13. While the conduit 9 which carries the cooling fluid of the automotive system may be of any general type, it is desirable to utilize finned tubing in order to provide the greatest possible heat transfer surface area.

While it is possible to utilize a separate heat exchanger system in the exhaust pipe it has been found convenient to combine the heat transfer unit with the muffler now in general use in automobiles thereby permitting its installation without extensive modification of the exhaust system. In such an arrangement the conduit 9 is coiled about the interior of the muffler 10, in contact with the exhaust gases moving therethrough.

As may be seen from Figures 2 and 3 the two-way valve 12 comprises a housing 14 having three conduits 7, 7a and 9 entering therein. The conduit 7 as noted before leads to the water pump 4 and contains cooling water under a positive pressure. The conduit 9 leads through the exhaust gas-to-water heat exchanger 10 and the conduit 7a is a by-pass conduit which is in parallel with the conduit 9 and which leads through the one-way valve 13 to the heat exchanger 1 by means of the conduit 7b. Seated within the housing 14 is a rotatable valve core 15 having a single aperture therethrough. This aperture is shaped as shown in Figures 2 and 3 so that when the core 15 is rotated in the clockwise direction to its extreme position as shown in Figure 3 the conduits 7 and 7a are connected together and the conduit 9 is blocked off. When the core 15 is rotated in the counterclockwise direction to its extreme position shown in Figure 2 the conduits 7 and 9 are connected and the by-pass conduit 7a is blocked off.

The one-way valve 13 at the outlet end of the conduit 9 is shown in Figure 4 in a simplified form. The conduit 9 leads into a housing 16 which has a valve seat 17 upon which the valve 18 seats. The valve 18 is maintained against the seat 17 by means of a spring 19 acting against the spring washer 20 of conventional form which is secured to the valve stem. The spring tension on the spring 19 is selected so that the valve 18 will become unseated when a positive pressure of several pounds is set up in the housing 16.

In operation, assuming that the engine 2 has not recently been started and the cooling water thereof is therefore cold, the valve 12 is placed in the position shown in Figure 2. Immediately upon the starting of the engine 2, hot exhaust gases will flow through the exhaust pipe 11 and through the heat-exchanger-muffler combination indicated at 10. At the same time cooling water will pass through the conduit 7 to the conduit 9 and into heat exchange relation with the exhaust gases passing through the exhaust pipe 11. This heat exchange relationship will transfer large quantities of waste heat from the exhaust gases to the cooling water in the conduit 9. The heated cooling water will, under the influence of the pressure imposed upon it by the water pump 4, open the one-way check valve 18 and pass through the conduit 7b through the heater core 1 and from thence through the conduit 8 to the engine 2.

It will thus be seen that the rapidly heated exhaust gas will heat the water in the automotive circulating system up to an operating temperature in a very rapid manner. This will cause the heater 1 to become effective almost immediately, thus eliminating the drawback of slow heating generally attributable to the hot water type of automobile heater. At the same time the automotive engine will be rapidly brought up to its optimum operating temperature. This latter will greatly facilitate operation of the engine in cold weather since, as is well known, internal combustion engines operate far more economically and are more easily controlled when in their design operating temperature range. By rapidly bringing the motor 2 up to operating temperature, the use of the choke may be discontinued very soon after operation of the engine has begun and the lubricating oil will also be more quickly reduced to its normal operating viscosity thereby facilitating lubrication of the rotating engine parts.

When the temperature of the circulating cooling fluid has reached the optimum, or operating, point the valve 12 is rotated in the clockwise direction to the position shown in Figure 3. In this position the conduit 9 is blocked off entirely and all flow from the water pump 4 is directed through the conduit 7, 7a and 7b.

In order to prevent the changing of the water in the now inactive conduit 9 into captive steam with the resultant possibility of explosion of the heat exchanger 10, the one-way valve 13 is provided. This valve prevents flow of fluid through the conduit 7, 7a from the heat exchanger back through the back entrance of the conduit 9. However it permits the flow of fluid or gas under pressure from the conduit 9 into the conduit 7b. Therefore when the conduit 9 has been closed and the still water in the heat exchanger 10 begins to change into steam with a resultant increase in pressure, the steam thus generated along with water remaining in the conduit 9 is expelled under the pressure of the generated steam out through the one-way valve 18 into the conduit 7. While this initial outflow of steam and water will of course add somewhat to the heat of the system, this additional heat input will soon be reduced to zero when all but a remaining small portion of steam has been ejected from the heat exchanger 10 through the one-way valve 18.

At this point it is noted that the pressure at which the valve 18 will open is designed to be substantially less than the pressure developed by the water pump 4. This prevents the build up of a high steam pressure in the heat exchanger 10 during its inoperative condition and permits the pressure of the water pump to over-ride the steam pressure without danger of kick-back when the valve 12 is returned to its heater position indicated at Figure 2.

While the control valve 12 may of course be manually operated between the positions shown in Figures 2 and 3, it may be desired that the valve 12 be controlled thermostatically. Such an arrangement is shown in diagrammatic form in Figure 5 wherein the valve 12a is indicated to be a thermostatic valve of conventional construction. In such a construction the valve core 15 would be under the influence of a bi-metal or other similar thermally responsive element responsive to the temperature of fluid in the conduit 7. Upon the fluid reaching the desired optimum operating temperature, the valve core 15 would be rotated into the position shown in Figure 3. Upon the cooling of the system to a point below the operating optimum temperature, as a result of the engine being removed from operation, the valve core 15 would then be returned by the thermostatic element to its original position shown in Figure 2 with the conduits 7 and 9 in connection.

The advantages of the present invention are readily apparent from the above disclosed construction. It will be seen that the desirable features of the hot water type of automobile heater are maintained and the main disadvantage heretofore found in connection with such heaters has been eliminated through the addition of auxiliary heat supplying means in connection with the rapidly heating exhaust gases. A further advantage is also provided in that the engine of the vehicle is quickly placed in its most economical, high temperature, operating condition.

It is apparent therefore that I have devised a novel automobile heating system constituting a great advance in the heater art. It will be understood of course that modifications and variations may be effected without departing from the scope of the novel concept of the present invention.

I claim as my invention:

1. In a heating apparatus for use with mechanisms having a water cooled engine, a first exhaust gas-to-water heat exchanger and a second water-to-air heat exchanger, a conduit system for said heat exchangers comprising a first two-way valve, and a second one-way valve, said two-way valve selectively passing water under pressure from the cooling system of the engine to said first heat exchanger or by a by-pass conduit leading directly to said second heat exchanger, and said second valve comprising a check valve allowing passage of fluid under pressure from said first heat exchanger to said second heat exchanger but which prevents flow of fluid therefrom back into said first heat exchanger.

2. A heating system utilizing the hot exhaust gases from a combustion engine comprising a first heat exchanger for transferring heat from said exhaust gases to a cooling liquid, a second heat exchanger for transferring heat from said cooling liquid to surrounding air, a liquid pump for circulating said cooling liquid under pressure, a control valve and a one-way valve for including or removing said first heat exchanger from connection with said second heat exchanger, said control valve comprising a two-way valve for selectively passing cooling liquid under pressure from said pump to said first heat exchanger or directly to said second heat exchanger, and said one-way valve comprising a check valve in the outlet of said first heat exchanger which permits flow of liquid from said first heat exchanger but which prevents flow back through said outlet into said first heat exchanger.

3. A heat exchanger system comprising a combustion engine having high temperature exhaust gases and a first exhaust gas-to-water heat exchange means cooperating therewith, second heat exchanger means for transferring heat from said water to surrounding atmosphere, a two-way control valve, a water circulating conduit system, a water circulating pump, and a one-way control valve, said conduit system comprising a first conduit connecting the high pressure side of said pump to said two-way control valve, a second conduit connecting said two-way control valve to said first heat exchanger, a third conduit connecting said two-way control valve to said second heat exchanger, a fourth conduit connecting said first heat exchanger to said one-way control valve and thereby to said third control conduit, fifth conduit means connecting said second heat exchanger to said combustion engine cooling system and sixth conduit means connecting said circulating system to the low pressure side of said water pump, said two-way control valve comprising a housing having an inlet from said water pump and two outlets to said second and third conduits respectively, and core means in said housing for selectively directing cooling water to said second or third conduits, and said one-way control valve comprising a check valve which permits fluid flow from said fourth conduit into said second heat exchanger and prevents retrograde movement of fluid back to said first heat exchanger.

4. An automotive heating system comprising an engine having a cooling liquid jacket, first exhaust gas-to-liquid heat exchanger means second liquid-to-air heat exchanger means and a two-way control valve system, said control valve system comprising a first conduit from said liquid jacket to said control valve, a second conduit from said valve to said first heat exchanger, a third conduit from said valve to said second heat exchanger, a fourth conduit from said first heat exchanger to said third conduit and a one-way valve connecting said fourth conduit to said third conduit whereby fluid under pressure may pass from said fourth conduit to said third conduit but retrograde movement of fluid under pressure from said third conduit to said fourth conduit is prevented, whereby positioning of said two-way valve in a first position will cause fluid to pass through said first conduit to said second conduit through said fourth conduit to said third conduit to said second heat exchanger means and whereby movement of said control valve to its second position will cause flow directly from said first conduit to said third conduit to said second heat exchanger means thereby bypassing said first heat exchanger means and permitting steam resulting from the non-circulation of the liquid in said first heat exchanger when said first valve is in said second position to pass out through said one-way valve into said third conduit without danger of exploding said first heat exchanger.

5. An auxiliary heat exchange unit for cooperating with the circulating cooling system of an internal combustion engine employing cooling liquid subject to vaporization upon the application of excessive heat thereto which comprises an engine exhaust gas-to-cooling liquid heat exchanger, a manual two-way valve connecting said heat exchanger to said circulating system and a one-way safety check valve connecting the outlet of said heat exchanger to said circulating system, said two-way valve comprising a two-way valve core which selectively directs cooling fluid into and through said heat exchanger or by-passes said heat exchanger, and said one-way valve comprising a check valve which permits fluid flow from said heat exchanger but prevents reverse flow thereinto whereby pressure build-up in said exhaust gas-to-cooling liquid heat exchanger is prevented subsequent to actuation of the two-way valve into position to by-pass said heat exchanger.

References Cited in the file of this patent

UNITED STATES PATENTS

| | | |
|---|---|---|
| 1,584,002 | Aeby et al. | May 11, 1926 |
| 1,895,503 | Will | Jan. 31, 1933 |
| 2,103,947 | Holmes | Dec. 28, 1937 |
| 2,212,250 | Schutt | Aug. 20, 1940 |
| 2,266,193 | Grutzner | Dec. 16, 1941 |
| 2,647,730 | Teague | Aug. 4, 1953 |
| 2,694,528 | Ricks | Nov. 16, 1954 |

FOREIGN PATENTS

| | | |
|---|---|---|
| 381,596 | Italy | July 13, 1940 |